Jan. 31, 1950     H. FINK     2,495,841

SURFACE GAUGE

Filed June 13, 1946

Homer Fink
INVENTOR.

BY *CA Snow & Co.*

ATTORNEYS.

Patented Jan. 31, 1950

2,495,841

UNITED STATES PATENT OFFICE 2,495,841

SURFACE GAUGE

Homer Fink, Topeka, Kans.

Application June 13, 1946, Serial No. 676,504

1 Claim. (Cl. 33—93)

My present invention relates to an improved surface gage and more particularly to the type of gage designed for use in laying out scribe marks or lines upon cylindrical surfaces. The gage of my invention is so constructed as to permit scribing accurately both upon the cylindrical surface of the work and also upon the ends thereof, and the gage comprises a unique and novel combination and arrangement of parts as will be hereinafter fully described.

In the accompanying drawings I have illustrated one complete example of the physical embodiment of my invention according to the best mode I have thus far devised but it will be understood that various changes and alterations may be made in the exemplified structure within the scope of the appended claim.

In the drawings.

Referring now to the drawings wherein like parts are indicated by like characters, I have illustrated the gage of my invention in position upon a cylindrical object of work as 2 and upon which it may be desired to place accurate scribing marks as suggested by the dotted lines in Figure 1.

Figure 1:
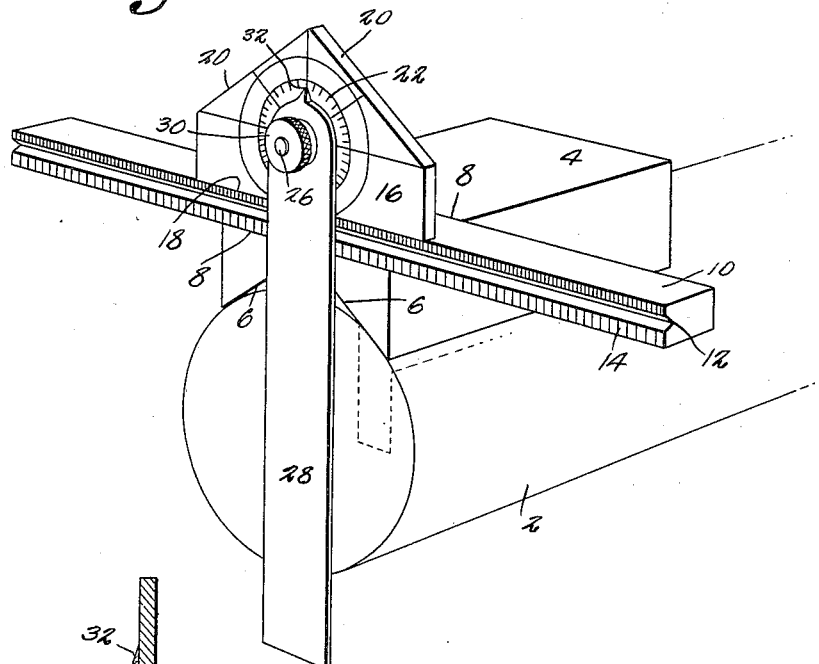
Figure 1 is a perspective view of the gage of my invention shown in position upon a cylindrical piece of work.
Figure 2:
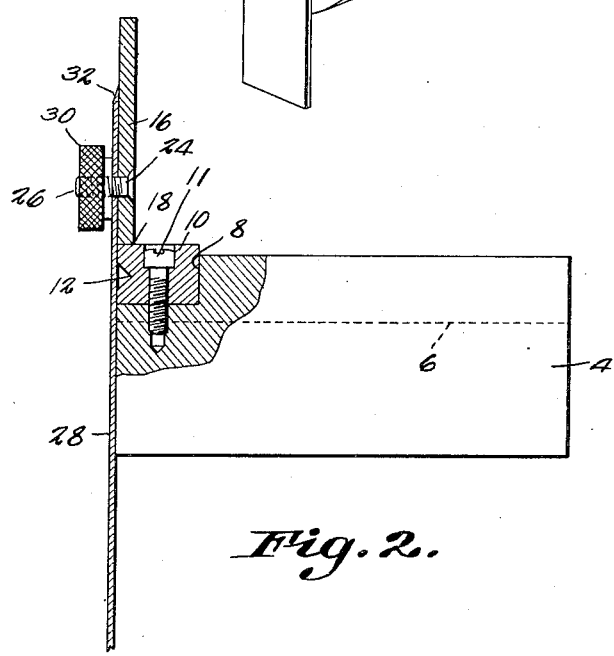
Figure 2 is a longitudinal vertical sectional view of the gage of my invention.

The gage comprises a steel block 4 generally rectangular in shape and having the lower side formed with a V-shaped groove 6 the walls of which groove are cut at 45 degrees from the vertical side walls of the block.

In a lateral groove 8 at one end of the block I have placed the bar 10 secured by screws 11 and comprising a straight edge. The outer edge of the bar is formed with a longitudinal V-shaped groove 12, and the surface edges on either side of the groove are calibrated as at 14 in suitable measuring indications.

Adapted to slide from the straight edge is the head 16 having a lower co-acting straight edge 18 and this head is formed with converging edges 20 cut at 45 degrees from the vertical sides of the head.

The head 16 is also calibrated in radial degrees as at 22, and through a hole 24 in the head I utilize a bolt 26 upon which is pivotally mounted the arm 28 secured thereon by means of the knurled nut 30. The arm 30 depends from its pivotal support on the head in position to act as a straight edge for the scribing of vertical or angular lines upon the end of the cylindrical work.

A pointer 32 on the upper end of the arm may be set at the desired degree of angularity and the nut tightened so that the arm may be used for scribing.

The straight edge 18 of the head is also adapted for use for longitudinal or angular scribing of the work by placing the straight edge 18 of member 16 over the longitudinal groove 12 of the bar 10 in which case the arm 28 will lie over the work and longitudinally thereof so that described markings may be made on the work.

From the above description of the gage of my invention it will be apparent that this device may be used as set forth or it may be clamped to the shaft leaving both of the operator's hands free for scribing.

The gage may also be well employed for other purposes such as grinding drill bits to the proper angle, and determining the angle of tapered shafts, gears, and the like.

Having thus fully described my invention what I claim as new and desire to secure by Letters Patent is:

A gauge adapted for use with cylindrical work and comprising a longitudinally disposed block having a V-shaped groove formed in the lower work engaging surface thereof, providing spaced work engaging edges, said block having a lateral groove formed in its upper edge, the groove extending inwardly from one end of the block, a straight edge calibrated bar, a screw extending through the bar embedded in the block removably securing the bar within the lateral groove, the ends of the calibrated bar extending substantial distances beyond the sides of the block, the longitudinal edge of the bar having the calibrations, being formed with a groove disposed intermediate the upper and lower surfaces of the block, providing spaced longitudinal surfaces differently calibrated, a calibrated head having a straight lower edge and converging upper edges converging towards a center line drawn through the head, said calibrated head being slidable on the bar, a scribing arm pivotally supported on the head, a pointer on the pivot end of the scribing arm cooperating with the calibrations on the head in measuring, and means for securing the arm in adjusted positions with respect to the calibrations on the head.

HOMER FINK.

REFERENCES CITED

The following references are of record in the file of this patent:

UNITED STATES PATENTS

| Number | Name | Date |
|---|---|---|
| 488,327 | Brown | Dec. 20, 1892 |
| 686,891 | Dunbar | Nov. 19, 1901 |
| 786,824 | Lynn | Apr. 11, 1905 |
| 986,783 | Tschop | Mar. 14, 1911 |
| 994,570 | Del Castillo | June 6, 1911 |
| 1,296,720 | Verwys | Mar. 11, 1919 |